United States Patent [19]
Evans et al.

[11] Patent Number: 4,506,738
[45] Date of Patent: Mar. 26, 1985

[54] LIQUID-PROJECTING MONITOR

[75] Inventors: John L. Evans, Chamberley; Kuldip Bains, Slough, both of England

[73] Assignee: Chubb Fire Security Limited, Sunbury-on-Thames, England

[21] Appl. No.: 485,798

[22] Filed: Apr. 18, 1983

Related U.S. Application Data

[63] Continuation of Ser. No. 243,305, Mar. 13, 1981, abandoned.

[30] Foreign Application Priority Data

Mar. 13, 1980 [GB] United Kingdom ................. 8008524

[51] Int. Cl.³ ............................................. A62C 27/00
[52] U.S. Cl. ........................................ 169/24; 239/587
[58] Field of Search ....................... 169/51, 52, 24, 70; 239/587, 590, 461, 590.5, 589

[56] References Cited

U.S. PATENT DOCUMENTS

| Re. 20,488 | 8/1937 | Zinkil | 239/587 |
|---|---|---|---|
| 255,430 | 3/1882 | Holland, Jr. | 239/587 |
| 1,187,588 | 6/1916 | White | 239/587 |
| 2,111,553 | 3/1938 | Chew | 239/587 |

FOREIGN PATENT DOCUMENTS

| 701709 | 3/1931 | France | 239/587 |
|---|---|---|---|
| 1295 | of 1909 | United Kingdom | 239/587 |
| 770330 | 3/1957 | United Kingdom | 239/587 |

Primary Examiner—Joseph J. Rolla
Assistant Examiner—Kenneth Noland
Attorney, Agent, or Firm—Pollock, Vande Sande & Priddy

[57] ABSTRACT

A liquid-projecting monitor of the spherical head type has its head sealing against a housing which defines together with the head a chamber from which liquid is lead into a passage in the head and then to a nozzle coupled to the head. The head is borne by a horizontal axle for pivotal movement relative to the housing so as to adjust the angular elevation or depression of the nozzle. A center body extends transversely across the interior of the head to enclose the axle and is so shaped, together with the internal surface of the head, that the cross-sectional area of the passage within the head available for liquid flow is maintained at least approximately constant throughout its length, so as to minimize the pressure drop in the liquid flow which passes through the head.

4 Claims, 10 Drawing Figures

LIQUID-PROJECTING

This is a continuation, of application Ser. No. 243,305, filed Mar. 13, 1981 now abandoned.

The present invention relates to liquid-projecting devices and is concerned especially with fire fighting devices of the type commonly referred to as cannons, monitors or turrets, (hereinafter referred to collectively as "monitors"), which are used for directing jets of water or foam at a fire. Typically, a monitor comprises a nozzle borne by a mechanism which permits the orientation of the nozzle to be adjusted by pivotal movements about two orthogonal axes—a generally vertical axis about which the nozzle can be pivoted to traverse its jet from side to side, and a generally horizontal axis about which the nozzle can be pivoted to adjust its angular elevation or depression. Such devices may be embodied as portable free-standing units to be set up as required at the scene of a fire, or may be mounted on trailers or self-propelled fire fighting vehicles, or may be used in fixed installations at tanker jetties, oil refineries or other fire risk areas. Although primarily concerned with the field of fire fighting, monitors in accordance with the invention may nevertheless find application in other fields of use, e.g. in certain forms of mining and industrial washing processes, and generally where there is a need to control the direction through space of relatively high pressure, high flow rate jets of water or other liquids.

The type of monitor with which the invention is more particularly concerned is that which will be hereinafter referred to as a 'spherical head monitor'. By that is meant a monitor in which the nozzle is carried by a hollow member (the 'head') which has a frusto-spherical external surface sealing against a housing which defines, together with the head, a chamber from which the liquid is led into a passage defined within the head and thence to the nozzle. The head is borne for pivotal movement relative to the housing about a generally horizontal axis so as to provide adjustment of the angular elevation or depression of the nozzle, throughout the permitted range of such movement the frusto-spherical surface of the head forming a sliding seal against the housing to maintain the aforesaid chamber liquid-tight. The assembly of head and housing may also be borne for pivotal movement as a whole about a generally vertical axis, thereby to traverse the jet which issues from the nozzle from side to side.

Spherical head monitors are known in fire fighting and have the advantage of being compact and of relatively light weight, particularly as compared with the more conventional bifurcated type of device where the liquid is led towards the nozzle in two separate streams through hollow horizontal axles of the elevation/depression adjusting mechanism. However, a drawback of existing spherical head monitors arises from the fact that in the past little attention has been paid to the hydrodynamics of the passage within the head through which the liquid must flow on its way to the discharge nozzle. Thus the interior surface of the head typically is itself frusto-spherical, meaning that there is considerable divergence and then convergence in the cross-sectional area of the passage available for flow. Furthermore in some designs a cylindrical axle by which the head is borne for its pivotal movement relative to the housing passes transversely across the interior of the head, tending to induce turbulence in the liquid flow downstream of the axle. The effect of these measures is that there is a significant pressure drop in the flow as it passes through the head.

It is an aim of the invention to reduce this problem, and accordingly in one aspect the invention resides in a spherical head monitor wherein the head is so configured that the cross-sectional area of the passage within the head which is available for liquid flow is at least approximately constant throughout its length. A head constructed in this manner may achieve a significant reduction in the pressure drop of liquid flowing through it as compared with that experienced with prior art heads.

As it is a convenient method of bearing the head relative to the housing in a spherical head monitor to provide an axle passing transversely through the width of the head, the invention also provides, in a preferred embodiment in which this bearing arrangement exists, a body extending transversely across the interior of the head to enclose a said axle and to define in part the confines of said passage.

These and other features of the present invention will now be more particularly described, by way of example, with reference to the accompanying drawings, in which.

Figure 1:
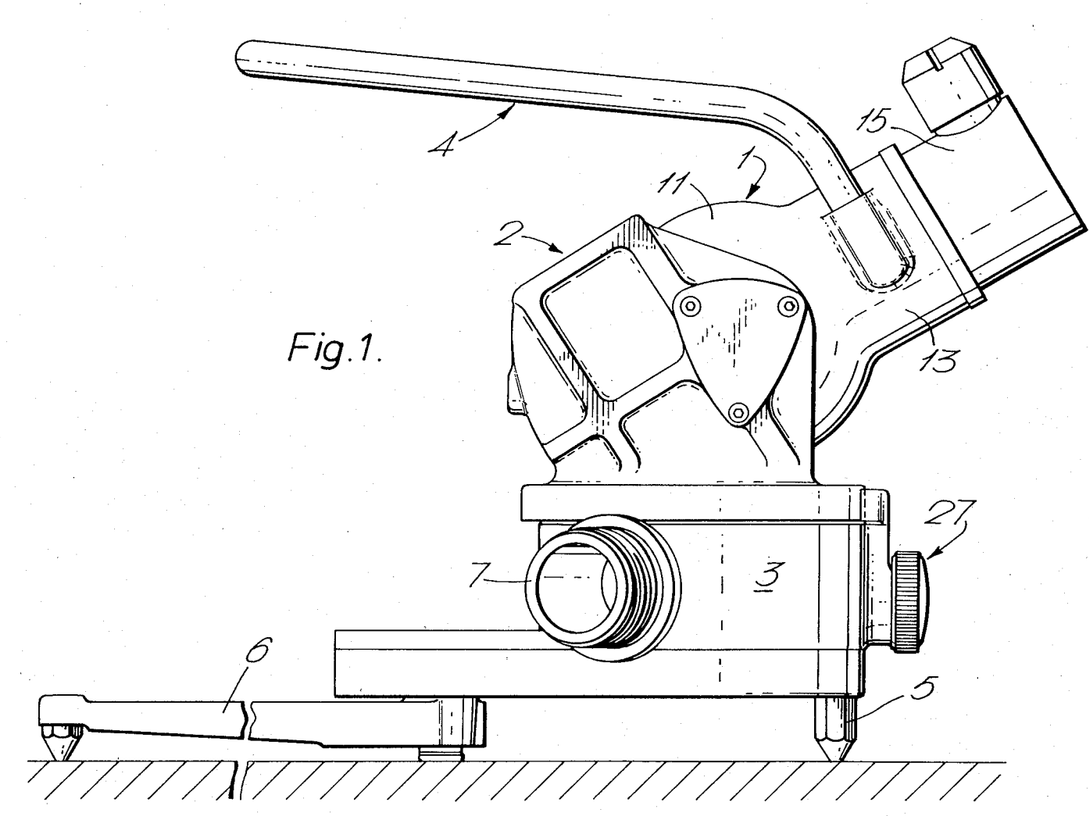
FIG. 1 is an elevation of a first embodiment of a spherical head monitor according to the invention.
Figure 2:
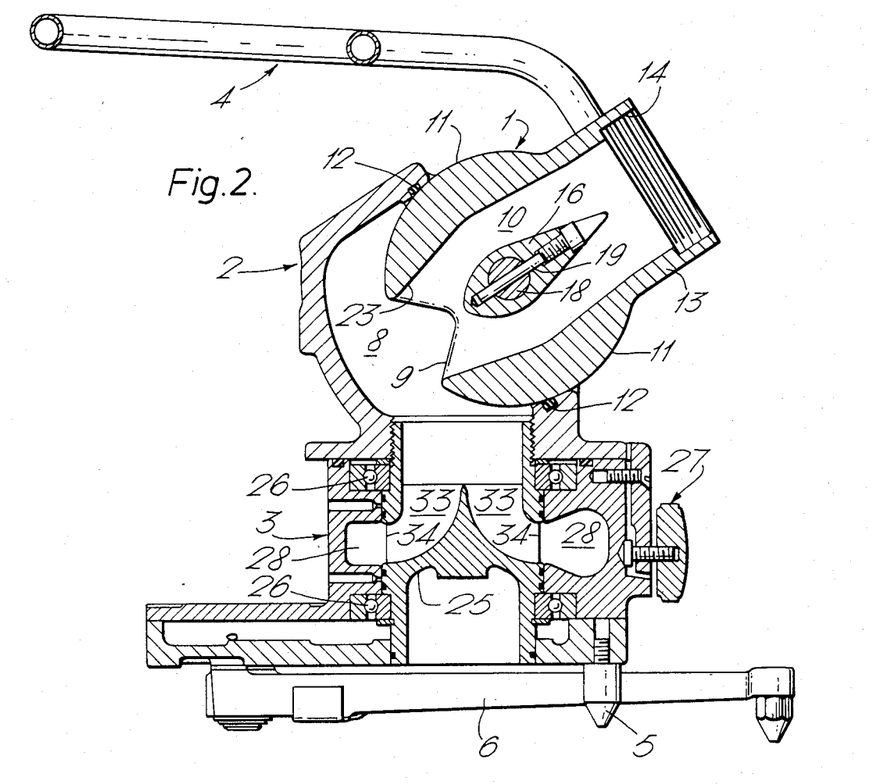
FIG. 2 is a vertical section through the monitor of FIG. 1.

Referring to FIGS. 1 & 2, there is shown a portable, ground-standing spherical head monitor in accordance with the invention, its head 1 being pivoted about a horizontal axis in a housing 2, and the assembly of head 1 and housing 2 being pivoted about a vertical axis in the body 3, all as more fully described hereinafter. A handle bar 4 is attached to the head 1 in order to facilitate manual adjustment of its orientation. The monitor has a fixed front foot 5 and a pair of rear legs 6 which can be swung out from a stowed position beneath the body 3 (FIG. 2) to their operative, stabilising positions (FIG. 1) when the monitor is set up for use. Inlet couplings 7 for water hoses are provided to each side of the body 3, water supplied to these inlets being led through the body and housing 2 to the head 1 as will be more fully described hereinafter.

Referring now more particularly to FIG. 2, the head 1 and housing 2 define together a chamber 8 from which water is led through an inlet 9 in the rear of the head to a passage 10 extending through the head. The head has a frusto-spherical external surface 11 which forms a sliding seal against an O-ring 12 held in the housing 2, to keep the chamber 8 water-tight throughout the permitted range of pivotal movement of the head relative to the housing. From the spherical portion of the head there extends a short barrel portion 13 terminating in a threaded socket 14 to which may be coupled a water nozzle or foam branch pipe or an adaptor therefor, (e.g., as indicated at 15 in FIG. 1).

The internal form of the head 1 appears from FIGS. 3-6. An integral centre body 16 extends transversely across the interior of the head, the head and centre body being formed from a single casting, e.g. in aluminium alloy. A bore 17 is formed in the centre body, its axis passing through the geometrical centre of the frusto-spherical surface 11 of the head, and an axle 18 passes through the bore 17, the head being fastened on the axle by means of a pin 19 passing through aligned bores 20 and 21 in the centre body and axle. The axle 18 is mounted at each end in bearings 22 in the housing 2 (FIG. 4), thereby to provide the pivotal movement for angular elevation and depression of the head. At one end of the axle there will be provided a hand-operated clutch arrangement (not shown) whereby the axle can be selectively locked to the housing with the head in a set angular orientation.

Figure 3:
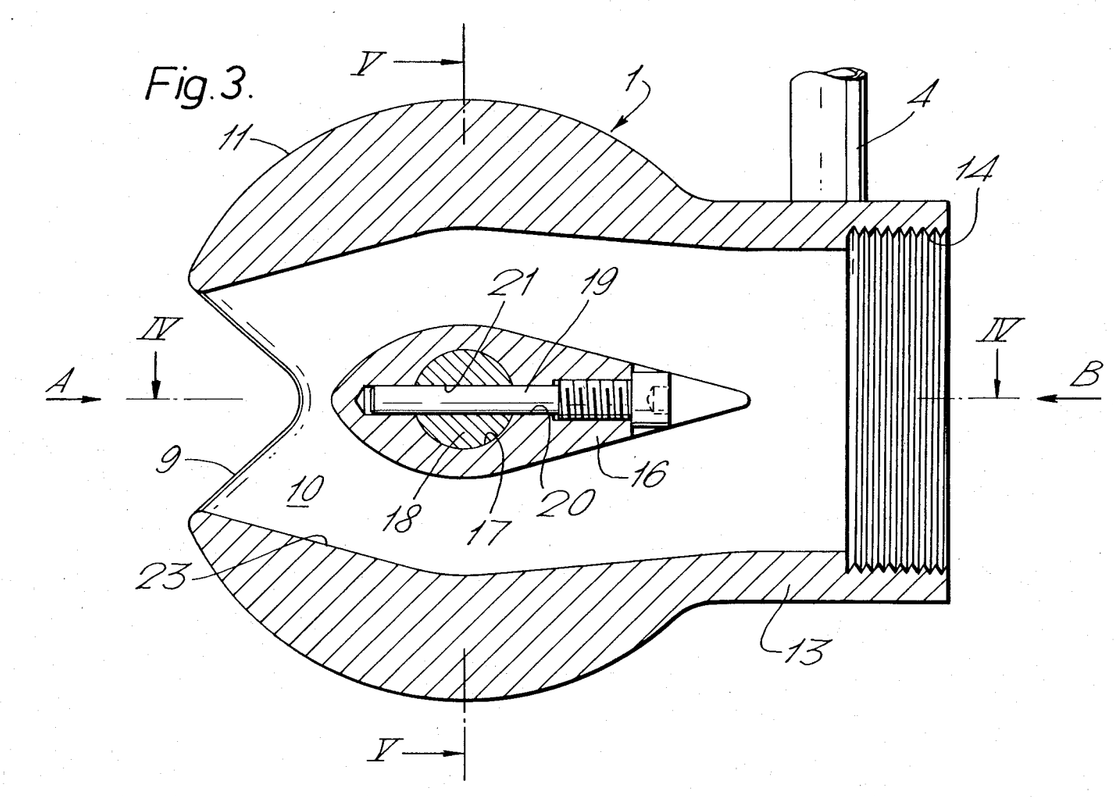
FIG. 3 shows the head of FIG. 2 to an enlarged scale.
Figure 4:
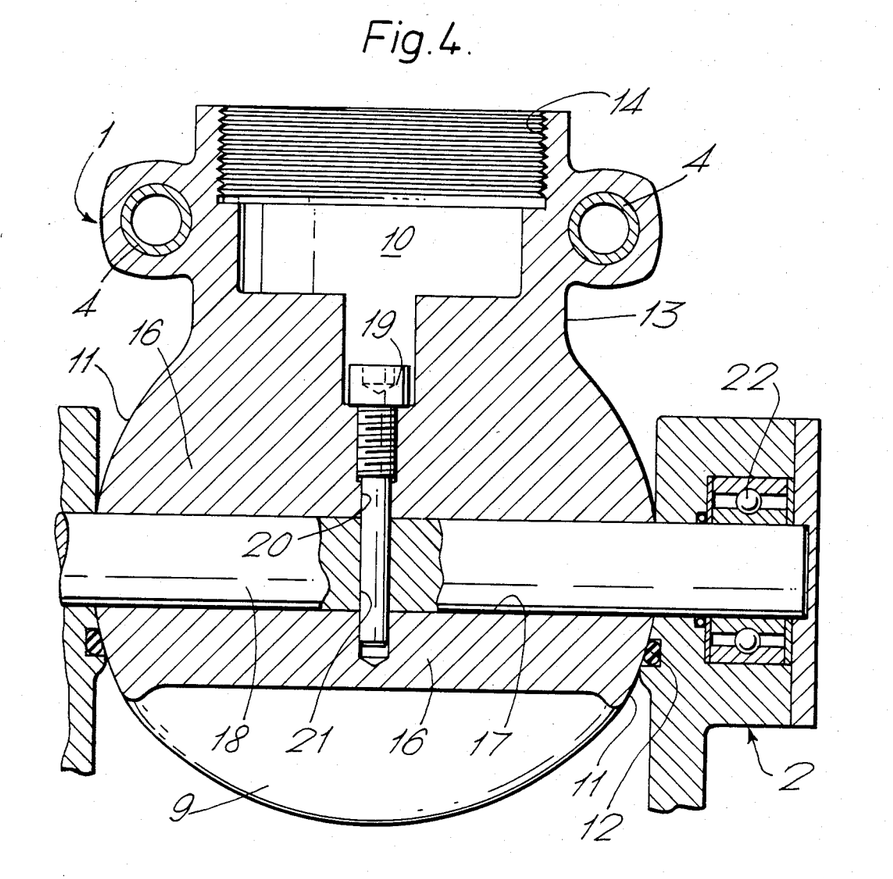
FIG. 4 is a section on the line IV—IV of the head of FIG. 3, showing also part of the adjacent housing.
Figure 5:
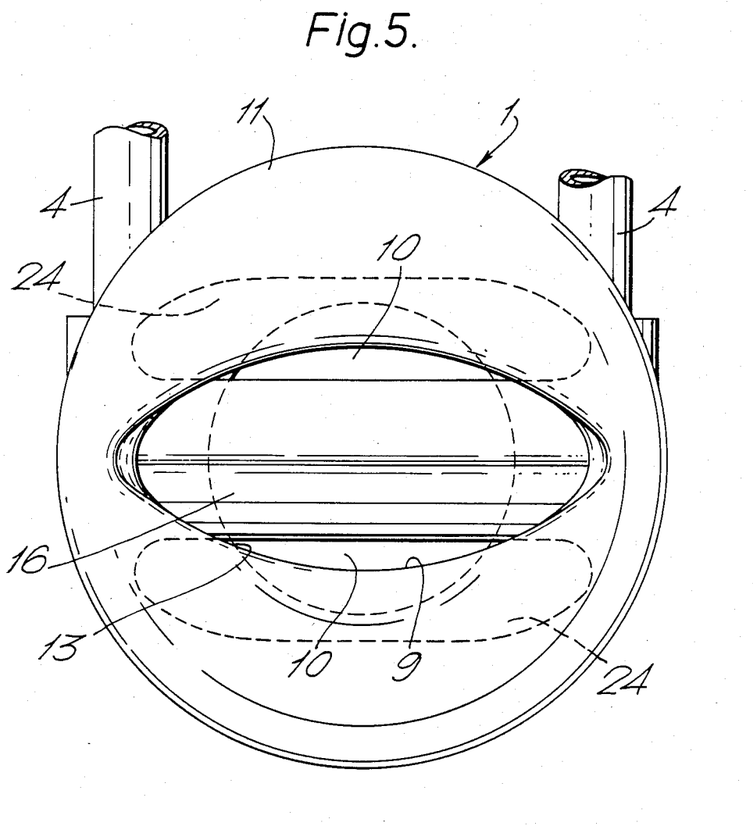
FIG. 5 is a view in the direction of arrow A of the head of FIG. 3.
Figure 6:
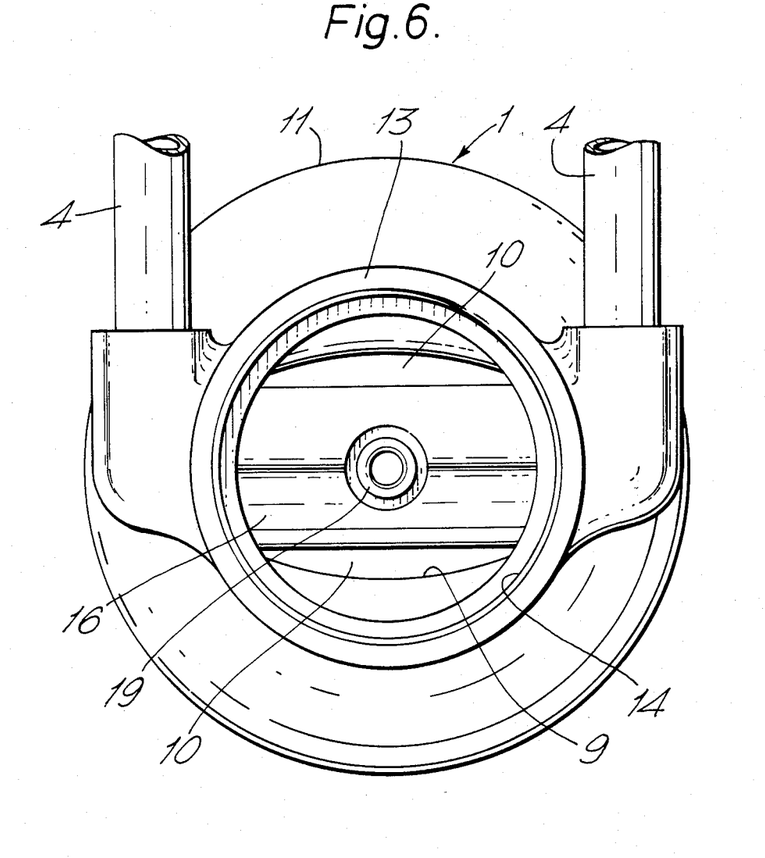
FIG. 6 is a view in the direction of arrow B of the head of FIG. 3.

As shown particularly in FIG. 3, the centre body 16 is shaped as a streamlined foil pointing upstream in the sense of water flow through the head, and acts to guide the water smoothly past the obstruction represented by the transverse axle 18. It defines together with the internal surface 23 of the head a passage 10 of which the cross-sectional area available for water flow is approximately constant throughout its length and which involves no abrupt changes in either direction or form. The form of surface 23 blends smoothly from an elliptical section at the inlet 9 to a circular section at the barrel portion 13. The cross-sectional form of the passage 10 as viewed on the line V—V of FIG. 3 is indicated at 24 in FIG. 5.

Returning now to FIG. 2, the housing 2 together with the head 1 is fastened to the top end of a vertical axle 25. This axle is mounted in bearings 26 in the body 3 for 360° rotation, thereby to provide unlimited traverse adjustment for the head. A hand-operated brake mechanism is provided at 27 whereby the housing 2 can be selectively locked to the body 3 with the head in a set traverse position.

Figures 7, 8, 9:
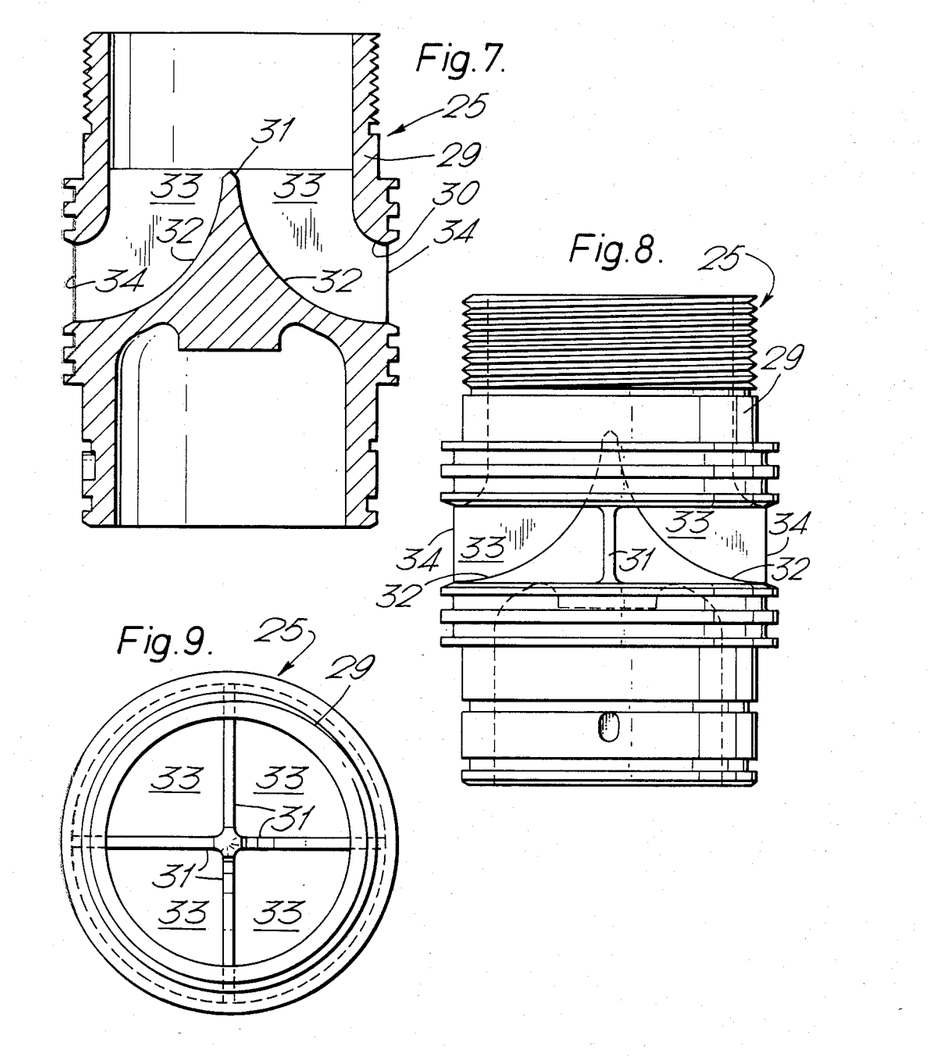
FIG. 7 shows the vertical bearing axle of FIG. 2 to an enlarged scale.
FIG. 8 is an elevation of the axle of FIG. 7.
FIG. 9 is a plan view of the axle of FIG. 7.

The axle 25 acts not only as a bearing member for the head but also to lead water to the chamber 8 from an annular chamber 28 formed in the body 3 and connected with the water inlets 7. The form of the axle is more clearly shown in FIGS. 7-9. It comprises an upper tubular portion 29 with a radiused edge at 30 and within which are provided four integral septa 31 and intervening profiled surfaces 32. In practice all these parts are formed from a single casting, e.g. in aluminium alloy. The resultant structure defines four sectoral channels 33 leading upwardly along arcuate paths from respective inlet apertures 34 defined beneath the tubular portion 29 and between the septa 31. As will be appreciated from FIG. 2 the apertures 34 communicate with the surrounding chamber 28, and they will remain in communication with that chamber irrespective of the relative rotational position of the axle 25 in the body 3. Water from chamber 28 is thus led smoothly upwards through a 90° angle in four separate streams by the channels 33, to unite in the top end of the axle and thence pass into the chamber 8.

Figure 10:
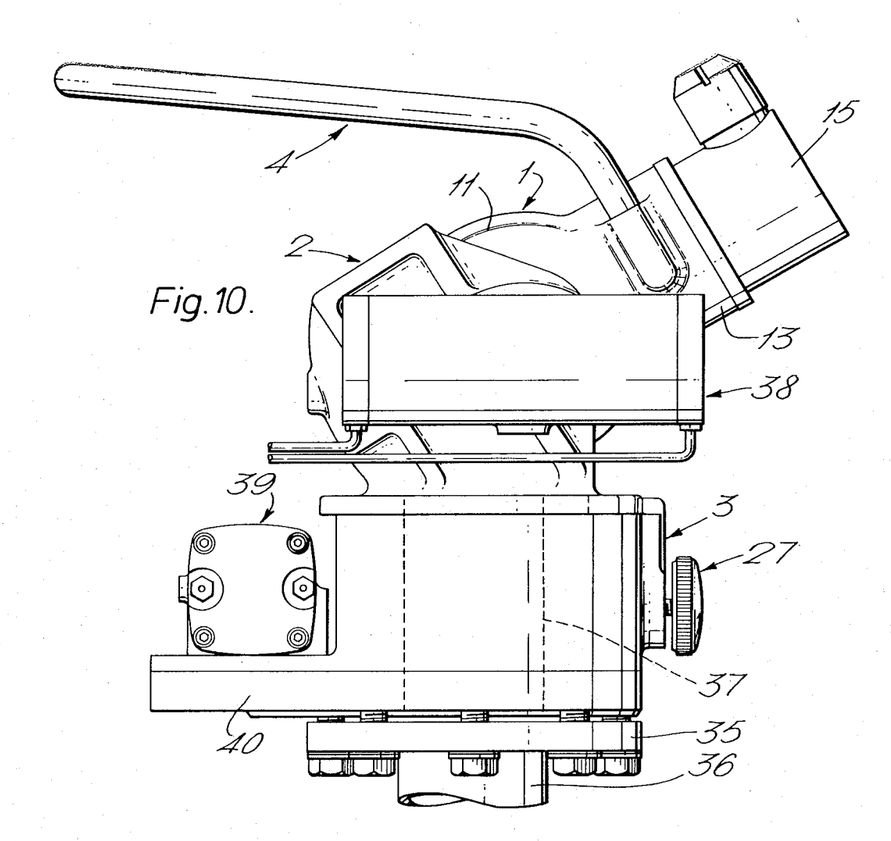
FIG. 10 is an elevation of a second embodiment of a spherical head monitor according to the invention.

FIG. 10 illustrates a similar type of monitor to that described above, like reference numerals being used to denote like parts, but in this case the monitor is adapted for remote as well as manual operation. The illustrated embodiment is shown mounted on a pedestal 35 and supplied with water from beneath by an inlet pipe 36. In this case therefore the side inlets 7 and chamber 28 described above are dispensed with and the pipe 36 leads sealingly into a plain tubular axle 37 in place of the axle 25 described above. In addition two double-acting hydraulic actuators 38 and 39 are provided, to which the supplies of working fluid can be controlled remotely. Each actuator comprises a double-acting piston driving a sector gear so as to provide a rotary displacement output in dependence upon the differential pressure applied across the piston. The actuator 38 drives an extension of the axle 18 by which the head 1 of the monitor is pivoted in the housing 2, thereby to achieve remote adjustment of the orientation of the head in elevation and depression; and the actuator 39 drives the axle 37 via a ring gear located in the lower portion 40 of the body 3, thereby to achieve remote traverse adjustments for the head.

By way of example, a portable, ground-standing fire fighting monitor substantially as shown in FIGS. 1 to 9 has been constructed with an outlet (14) diameter of 3 inches (76 mm) and is capable of handling water flows of up to 1600 liters/minute at an operating pressure of 20.5 bar. The pedestal-mounted version of FIG. 10, with the same diameter outlet, can handle flows of up to 2270 liters/minute at the same operating pressure. Tests indicate that these monitors achieve a reduction in pressure drop in the flows passing through them of at least 30% as compared with equivalent prior art spherical head monitors of the type previously indicated when passing the same rate of flow.

We claim:

1. A liquid-projecting monitor comprising a housing, and a head for carrying a nozzle; the head having a frusto-spherical external surface and having a passage within the head for liquid flow to the nozzle; the housing defining together with the head a chamber from which liquid is led into said passage within the head through an inlet thereof and thence through said passage to the nozzle; the head being borne for pivotal movement relative to the housing about a generally horizontal axis so sa to provide adjustment of the angular elevation or depression of the head; the frusto-spherical surface of the head forming a sliding seal against a portion of the housing to maintain the aforesaid chamber liquid-tight throughout the permitted range of said pivotal movement; the cross-sectional area of said chamber immediately upstream of the inlet of said passage being substantially greater than the cross-sectional area of said inlet; said inlet being of generally elliptical cross-section with the longer cross-sectional dimension thereof being generally parallel with the axis about which the head pivots relative to the housing and throughout at least a major part of the range of pivotal movement of the head relative to the housing both the upper and lower margins of said inlet remaining spaced from the internal surface of the housing; and the head being so configured that the cross-sectional area of said passage within the head which is available for liquid flow is at least approximately constant throughout the length of said passage.

2. A liquid-projecting monitor comprising a housing, and a head for carrying a nozzle; the head having a frusto-spherical external surface and having a passage within the head for liquid flow to the nozzle; the housing defining together with the head a chamber from which liquid is led into said passage within the head through an inlet thereof and thence through said passage to the nozzle; the head being borne for pivotal movement relative to the housing about a generally horizontal axis so as to provide adjustment of the angular elevation or depression of the head; the frustospherical surface of the head forming a sliding seal against a portion of the housing to maintain the aforesaid chamber liquid-tight throughout the permitted range of said pivotal movement; the cross-sectional area of said chamber immediately upstream of the inlet of said passage being substantially greater than the cross-sectional area of said inlet; throughout at least a major part of the range of pivotal movement of the head relative to the housing both the upper and lower margins of said inlet remaining spaced from the internal surface of the housing; the head being so configured that the cross-sectional area of said passage within the head which is available for liquid flow is at least approximately constant throughout the length of said passage; the assembly of said head and housing being pivotal as a whole about a generally vertical axis, being borne in this respect by a hollow, generally vertical axle which turns together with said assembly and through which liquid is led into said chamber; and said generally vertical axle being surrounded by an annular feed chamber and having inlet apertures in its wall in communication with said feed chamber.

3. A monitor according to claim 1 or 2 wherein the portion of the housing which seals against the frustospherical surface of the head lies in a plane which is spaced upstream from the axis about which the head pivots relative to the housing.

4. A monitor according to claim 1 or 2 wherein said chamber is fed with liquid from below through a generally vertical duct the projected cross-sectional area of which intersects the head.

* * * * *

UNITED STATES PATENT AND TRADEMARK OFFICE
CERTIFICATE OF CORRECTION

PATENT NO. : 4,506,738
DATED : March 26, 1985
INVENTOR(S) : John L. Evans and Kuldip Bains It is certified that error appears in the above—identified patent and that said Letters Patent are hereby corrected as shown below:

On the title page;

In Section [75] "Chamberley" should be -- Camberley --;

In Section [63] delete "abandoned" and insert -- issued July 12, 1983 as U. S. Patent 4,392,618 --;

Signed and Sealed this

Twenty-seventh Day of August 1985

[SEAL]

Attest:

DONALD J. QUIGG

Attesting Officer

Acting Commissioner of Patents and Trademarks